United States Patent [19]

Schiesser

[11] 4,286,882
[45] Sep. 1, 1981

[54] APPARATUS FOR THE AUTOMATIC, UNIFORM DRAWING-IN OF ELASTOMERIC MATERIAL INTO WORM EXTRUDERS

[75] Inventor: Walter H. Schiesser, Zürich, Switzerland

[73] Assignee: Schiesser AG, Switzerland

[21] Appl. No.: 935,802

[22] Filed: Aug. 22, 1978

[30] Foreign Application Priority Data

Sep. 2, 1977 [CH] Switzerland ............... 10742/77

[51] Int. Cl.$^3$ ............................................. B28C 7/04
[52] U.S. Cl. ................................... 366/76; 264/40.7; 425/135; 425/147
[58] Field of Search ............... 264/40.7, 175, 176 F, 264/176 R; 425/130, 132, 146, 148, 136, 142, 145, 147, 206, 217, 135, 207, 214; 366/76

[56] References Cited

U.S. PATENT DOCUMENTS

| 1,156,096 | 10/1915 | Price ........................... 264/176 R |
| 2,384,521 | 9/1945 | Andersen et al. ................ 264/175 |
| 2,411,660 | 11/1946 | Manning ....................... 264/176 F |
| 2,755,506 | 7/1956 | Weber .......................... 264/176 R |
| 3,155,750 | 11/1964 | Dahn et al. ..................... 264/40.7 |
| 3,396,429 | 8/1968 | Geyer ........................... 425/147 |
| 3,636,149 | 1/1972 | Tambini ......................... 264/40.7 |
| 3,712,773 | 1/1973 | Baumgarten ..................... 425/142 |
| 3,728,056 | 4/1973 | Theysohns ....................... 425/145 |
| 3,858,857 | 1/1975 | Ulm ............................ 425/145 |

FOREIGN PATENT DOCUMENTS

| 2429203 | 1/1976 | Fed. Rep. of Germany ........ 425/147 |
| 47-15223 | 5/1972 | Japan ........................ 264/142 |
| 681309 | 10/1952 | United Kingdom .............. 425/147 |

Primary Examiner—Jay H. Woo
Attorney, Agent, or Firm—Ostrolenk, Faber, Gerb & Soffen

[57] ABSTRACT

A method of, and apparatus for, automatically and uniformly drawing-in elastomeric material into worm extruders comprising at least one draw-in roll for the material mixture, arranged in spaced relationship in front of the extruder worm or screw and driven independently of the worm. The draw-in roll is driven in a manner such that it only can transmit a predetermined adjustable rotational moment which is limited towards an upper range, or, if desired, the rotational speed of the draw-in roll is controlled as a function of a maximum upwardly limited pressure prevailing within a draw-in or infeed pocket between the draw-in roll and the worm or screw.

9 Claims, 2 Drawing Figures

APPARATUS FOR THE AUTOMATIC, UNIFORM DRAWING-IN OF ELASTOMERIC MATERIAL INTO WORM EXTRUDERS

BACKGROUND OF THE INVENTION

The present invention relates to a new and improved construction of apparatus for the automatic, uniform drawing-in or infeed of elastomeric materials to worm extruders and to a method of operating such worm extruders.

During the feeding or charging of extruders with a material mixture, the most different types of techniques have been used, and specifically ever since such equipment has been employed for fabricating sectional shapes, profiles, hoses or plates, in order to attain a uniform infeed of the material in an automatic fashion and a uniform pressure in the worm or screw.

What is of primary importance is that there is delivered in an absolutely uniform manner to the extruder the material mixture i.e. the material which is to be processed in the extruder, and equally that such material mixture is uniformly drawn into the worm or screw, so that there is accomplished a uniform, pulsation-free ejection at the injection head or injection disk or equivalent structure. An irregular infeed produces an irregular build-up of pressure which prevails from the rear towards the front in the direction of the exit side of the equipment, i.e. leads to pulsations, and thus, to irregular products having mass differences, since, as a result, also the pressure required for ejecting the material through the injection disk into the injection head or nozzle is irregular.

During the incipient stages of extruder technology, and in part this is also true at the present time, processes were employed working with hot fed extruders. Here, the strip-shaped material mixture was infed in a hot condition, in other words already pre-plasticized, from the rolling mill directly into the worm extruder. Each temperature difference emanating from the rolling mill or during the transport to the worm extruder in the material mixture, therefore had a negative effect and caused irregularities during conveying of the material into the threads of the worm or screw. This is so because colder and thus more rigid or harder, less plasticized material is better able to push material located further forwardly in the worm or screw and which is softer and more intensly plasticized owing to the action of friction and temperature. Hence, in the presence of different temperatures there arises an irregular or different forward feeding or pushing action which is exerted by the newly infed material, which, in turn, leads to pulsations which can be transmitted to the injection disk and thus to the outflowing product.

As to the cold filter-extruders which have been available on the market for a number of years and charged with cold and thus, temperature uniform mixture material-strips, it has been possible to eliminate the irregularities or fluctuations in regard to temperature differences, since the strips within the working chamber rapidly assume the constant or at most slight fluctuations in temperature prevailing in such work chamber. A retrofeed or repulsion of the mixture material back to the filling funnel however can not be directly prevented. The automatic constriction at the injection head or nozzle at the end of the worm (exit cross-section is smaller than the cross-section at the inlet) however leads both for hot as well as cold charged extruders always again to a repulsion or retrofeed of the mixture towards and through the infeed or filling funnel. As a result, the fed back conglomerates or lumps and/or the mixture material-strips are suddenly sheared and the worm or screw is partially empty until material can be again engaged. Due to the foregoing there are formed the previously discussed pulsations.

This requires that at this location there be present an operator for the purpose of observing the operation of the equipment, something which is extremely expensive in terms of the operator's salary requirements, and still he or she is incapable of preventing the damming-up of the material. So that the mixture material-strips can again be engaged, i.e. the worm or screw can again draw such in, the operator removes, with considerable effort, a lump or material conglomerate which has been forcefully pushed upwardly into the filling funnel or pushes such with a rod or the like downwardly. Both of these operations are dangerous, but still are utilized in a number of places. In both cases the uniform infeed of fresh material, and thus, a uniform pressing and infeed forwardly towards the injection head or nozzle is at least periodically interrupted, and therefore, also the uniform pressure of the material in the injection head and the outlet nozzle (injection disk). This leads to fluctuations in the dimensions and quality (compression and density of the material) of the outflowing product and results in a corresponding number of rejects.

Now attempts have been made in the rubber industry on a world wide basis to eliminate these negative effects by bringing about changes at the region of the draw-in zone or infeed zone at the extruder. However, up to the present time no satisfactory solutions have been found.

In lieu of strip-like material there has been infed granulate i.e. grains, something which indeed improves the regularity or uniformity of the infeed of the mixture material due to the possibility of exactly dosing the same by the employment of vibrator troughs. Yet, this technique has not been able to eliminate the damming-up of the material. Additionally, the ejection (capacity) was reduced by about 15%. The production of the granulate also is associated with additional costs and its storage and transport is problematic, since, for instance, soft rubber granulate tends to easily bond to one another. The inclusion of parting or separating compounds or agents, such as for instance, talcum, by virtue of the large surface of the granulate is associated with the danger of impairing the quality of the mixtures.

It is here mentioned that the processing of non-elastomeric plastics is much simpler, since, on the one hand, the granulate does not tend to adhesively bond, and, on the other hand, there can not practically occur any damming-up since thermoplastic material due to the heating-up thereof and the thus occuring plastification as it passes through the worm or screw threads, becomes so soft that there does not prevail within the material sufficient force in order to push such towards the rear. The material therefore simply escapes rapidly towards the front out of the injection disk and therefore does not produce any damming-up. Granulate or granular material for feeding extruders in the form of elastomeric mixtures, especially rubber mixtures, are thus predominantly still only used during cable fabrication since for this purpose there can be employed for the most part markedly filled, stiff mixtures which owing to this stiffness or rigidity possess a larger pressure force than material which has already been somewhat plasticized at the front threads of the worm, and thus, overcome the damming-up force (the same as for plastics). Additionally, the production capacity of extruders employed for cable fabrication is much smaller than for rubber production, such as sectional shapes or profiles, hoses or plates (approximately 40% in contrast to 85%) so that a loss in capacity and a smaller ejection quantity due to the use of granulate is not disturbing.

A widely attempted solution for eliminating the problem of the damming-up of the material resorts to the technique of arranging at the inlet of the material into the extruder a so-called supply or infeed roll which comprises a roll driven in opposite rotational sense to the rotational sense of the worm or screw. While this procedure allows for an improvement as concerns the drawing-in of the mixture material-strips, still here also there can not be eliminated a damming-up and escape of mixture material past the exit.

In the case of large extruders working with about 150 mm worm diameter there also are employed so-called stoppers. A plunger presses the material into the filling funnel. In this way it is possible to push back the damming-up material into the worm threads. Still, with this technique, there remains the pulsating problem which should be avoided, since the stopper or plunger must always again re-engage with the material and thus the applied pressure is not continuous. Also, it is impossible by means of the stopper or plunger to automatically regulate the quantity of material which should be taken-up by the worm. The stopper devices furthermore are constructionally complicated and extremely expensive.

In those instances where processing is accomplished with strip-shaped material, attempts have also been made to work with a technique where there is accomplished a change in the cross-section of the mixture material-strips which are to be infed. This requires a large expenditure and after a certain amount of time nonetheless still does not avoid the dam-up effect.

SUMMARY OF THE INVENTION

Hence, with the foregoing in mind it is a primary object of the present invention to provide a new and improved construction of apparatus, by means of which it is possible to at least extensively eliminate the aforementioned drawbacks, and which additionally affords advantages in extrusion processing and without any great cost can be installed at machines of every size and thereby brings the same positive results.

A further significant object of the present invention aims at the provision of a new and improved apparatus for the automatic, uniform drawing-in of elastomeric material into worm extruders in a manner avoiding the previously mentioned disadvantages of the prior art constructions, and specifically preventing undesired retrofeed of the processed material and eliminating or at least reducing the undesired pulsation phenomenon.

Yet a further significant object of the present invention aims at a new and improved method of automatically, uniformly drawing-in elastomeric material into worm extruders or the like in a manner eliminating the previously discussed drawbacks, particularly as concerns damming-up of the processed material.

Now in order to implement these and still further objects of the invention, which will become more readily apparent as the description proceeds, the apparatus according to the present development is manifested by the features that there is provided at least one draw-in or infeed roll for the mixture material. The draw-in roll is arranged forwardly of the extruder worm or screw and driven independently of such worm. Specifically, the draw-in or infeed roll is driven in such a manner that it only can transmit a predetermined, adjustable, upwardly limited rotational moment, or, if desired, there can be controlled the rotational speed of the draw-in roll as a function of an upwardly limited maximum pressure prevailing in a draw-in pocket or channel between the draw-in roll and the worm.

There are preferably utilized two counter-rotating, driven draw-in or infeed rolls. As the drive there are suitable hydraulic motors or the like or hydrostatic drive units.

With direct control of the rotational speed of the draw-in or infeed rolls there is advantageously provided a pressure gauge or manometer in the draw-in pocket, and the roll or roller speed is controlled for obtaining a predetermined maximum pressure.

With the inventive apparatus there are realized, among other things, the following notable advantages:

(a) continuously uniform filling of the worm threads;
(b) always the same pressure in the material at the worm threads (density of the material);
(c) uniform ejection and thus uniform products;
(d) increased output and thus less expensive fabrication;
(e) automatic draw-in of the mixture material-strips, in other words, completely automatic feed or charging;
(f) without any additional working operations there can be employed inexpensively fabricated, simple mixture material-strips; and
(g) saving in operator's wages.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
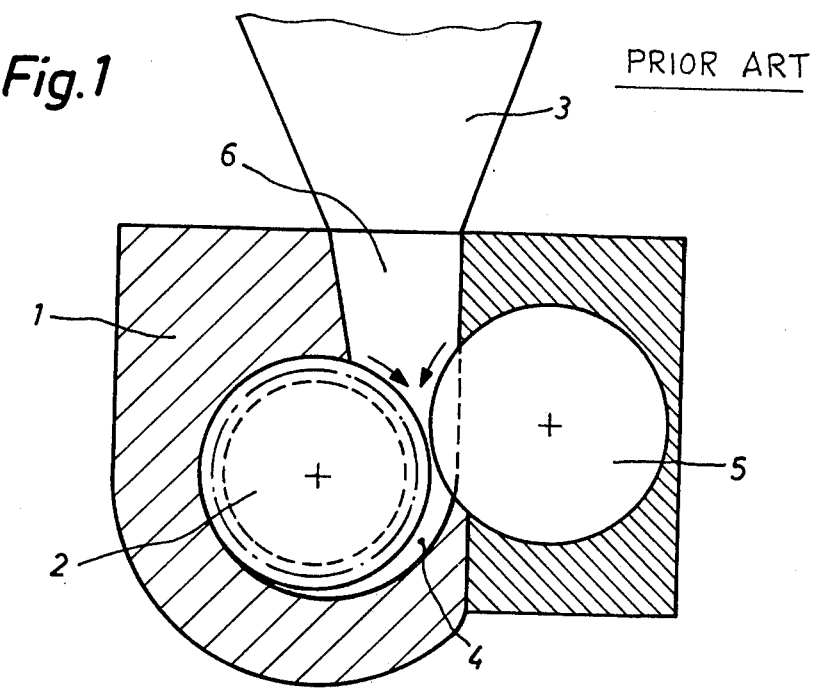
FIG. 1 is a schematic sectional view of a prior art extruder having a conventional supply or feed roll.

Describing now the drawings, in FIG. 1 there is shown a conventional prior art solution of worm extruder. This extruder comprises a housing 1 having a worm or screw 2. The housing 1 is filled by a filling funnel 3 or equivalent structure with material (granulate or strip-shaped material). In order to introduce the material into the worm or screw 2 there is provided a supply or infeed roll 5 which is driven in opposite rotational sense with respect to the direction of rotation of the worm 2 as indicated by the arrows. The drive of the supply roll 5 is accomplished by means of standard and therefore not particularly shown gearing directly from the worm or screw 2. Here, it is not possible to select the speed of the roll 5 independent of that of the extruder, i.e. the worm 2. Hence, the above-explained drawbacks can arise, i.e. the draw-in or infeed pocket or channel 4 can be overfilled, leading to pulsations at the worm or screw 2 and to retrofeed of the material back into the filling funnel 3.

Figure 2:
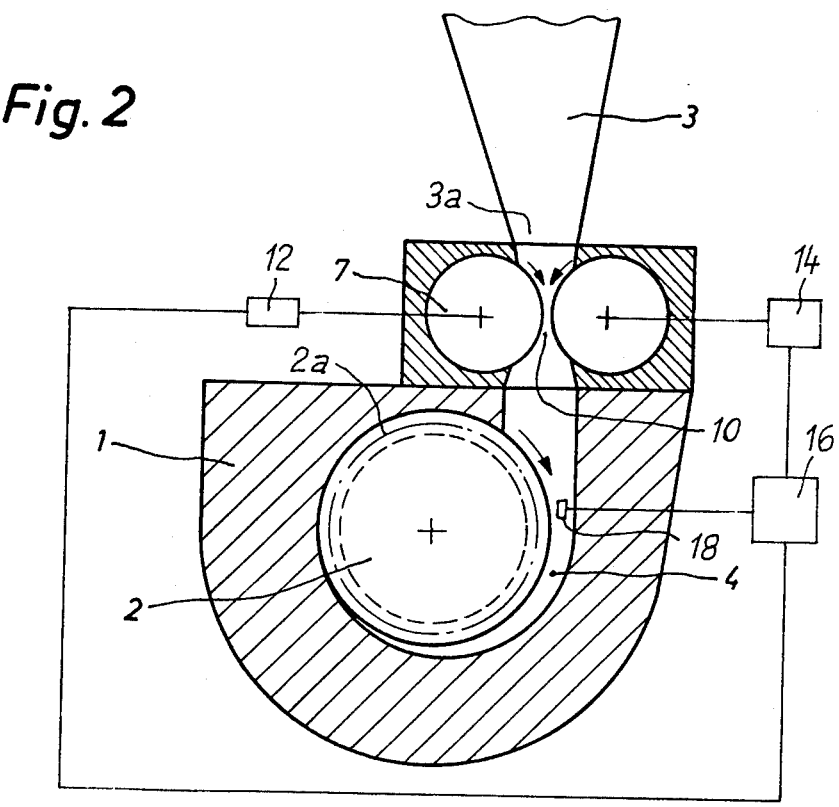
FIG. 2 is a likewise purely schematic sectional view of a worm extruder equipped with an apparatus constructed according to the teachings of the invention for the essentially automatic, uniform drawing-in or infeed of elastomeric material to the worm extruder.

Now in FIG. 2 of the drawing there is illustrated a preferred constructional embodiment of apparatus designed accorded to the teachings of the present invention and serving for the automatic, substantially uniform, drawing-in or infeed of elastomeric material into a worm extruder. Also in this case the extruder having a housing 1 and the worm or screw 2 has the material infed thereto by means of an infeed funnel 3 or other suitable material infeed means.

With the illustrated exemplary embodiment there is conveyed, for instance, strip-shaped material which is to be processed by means of two draw-in or infeed rolls 7 and 8 into the draw-in or feed pocket 4 and from that location transported to the operable zone of the worm or screw 2. Between the draw-in rolls 7 and 8, arranged in spaced relationship from one another at the outfeed end 3a of the infeed funnel 3, there is formed an infeed or draw-in gap or space 10 to provide a flow passage for the mass or material from the filling funnel 3 to the draw-in or feed pocket or channel 4. The draw-in rolls 7 and 8 have their axes arranged at an inclination or obliquely with respect to the lengthwise axis of the worm or screw 2. Further, these draw-in rolls can have a smooth or profiled outer surface.

Now in contradistinction to the prior art equipment, with the inventive apparatus, the draw-in or infeed rolls 7 and 8 operate independently of the drive of the extruder, i.e. the drive for the worm or screw 2 which has not particularly shown since the same in conventional. As will be explained more fully hereinafter, either the maximum transmittable rotational moment is adustably limited or the rotational speed is controlled as a function of the pressure in the pocket or chamber 4.

The apparatus is provided with at least one, but preferably two separate hydraulically driven rolls 7 and 8 which are arranged above the draw-in or infeed location of the worm or screw threads such that the backed-up or dammed-up material only can push back into the infeed funnel 3 to a certain height. At that location it is acted upon by the draw-in rolls 7 and 8 which counteract such movement and by the incoming strip-shaped mixture material or material to be processed and automatically and continuously forced back into the worm or screw threads, generally designated by reference character 2a, as soon as there has been reached the point of repulsion of the material towards the two draw-in rolls 7 and 8, which as a general rule occurs after about 2 to 5 minutes. Now there is insured for a continuous material packing or stuffing action with essentially uniform material infeed and the pressure exerted by the mixture material in the threads 2a of the worm or screw 2 is likewise essentially uniform and at the same time higher than that which prevails when resorting to conventional charging techniques.

Now as indicated heretofore at least one, but preferably both of the draw-in or infeed rolls are driven, such as by means of the schematically indicated hydraulic or hydrostatic drives 12 and 14, respectively, which are operatively connected with a control 16 responsive to one or more pressure measuring devices 18, for instance pressure gauges, arranged in the draw-in or infeed pocket 4. In this way, and specifically as a function of the pressure measured by the pressure measuring device or devices 18 the control or control means 16 is capable of controlling the drive means 12 and 14 of the draw-in rolls 7 and 8 in such a manner that the latter only can transmit a predetermined, upwardly limited adjustable rotational moment, or, if desired, there can be controlled the rotational speed of the draw-in rolls as a function of an upwardly limited maximum pressure prevailing in the draw-in pocket or channel 4 between the draw-in rolls 7 and 8 and the worm or screw 2. Obviously, if only one of the draw-in rolls 7 or 8 is provided with a drive, or even if both are provided with a drive, it is possible to only have the control unit 16 regulate one of the drives of the related draw-in roll, instead of acting upon both drives as shown with arrangement of FIG. 2.

The most essential concept resides in that by means of the contact pressure of the dammed-up material at the two draw-in or infeed rolls 7 and 8, with simultaneous infeed of new material, there is exploited the inherent regulation of the rotational moment of the, for instance, hydrostatic drives for accomplishing an automatic speed regulation of the draw-in rolls. Depending upon the pressure exerted at the rolls and thus also depending upon the quantity of the material the rotational speed of the draw-in rolls and thus the draw-in speed of the mixture material is automatically regulated, and therefore, the infed mixture material is regulated to an optimum receiving or take-up capability with constant pressure in the worm threads 2a. Without the need for an operator to be at the machine for monitoring purposes, the maximum receivable quantity of mixture or processed material is uniformly infed and taken-up without it being necessary to alter the dimensions of the mixture material-strips. At the same time there is continuously and uniformly tamped or packed the material, leading to a uniform pressure in the worm threads, and thus, also to uniform efflux and a constant product.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for automatically, substantially uniformly drawing-in elastomeric material into a worm extruder, comprising:
   a driven extruder worm;
   at least one draw-in roll for mixture material which is to be processed arranged in spaced relationship from and upstream of the extruder worm; variable speed means for driving said draw-in roll independently of said extruder worm;
   means defining a material draw-in pocket between the draw-in roll and the extruder worm downstream of the draw-in roll; and
   control means for controlling the drive speed of the draw-in roll such that it can transmit only a predetermined maximum adjustable moment as a function of the pressure up to a predetermined maximum pressure in the draw-in pocket between the draw-in roll and the extruder worm wherein the rotational moment is adjusted in response to said pressure.

2. The apparatus as defined in claim 1, further including:
   at least one additional draw-in roll;
   drive means for driving the additional draw-in roll in an angular direction opposite to that of the first-mentioned draw-in roll;
   said two draw-in rolls being spaced from each other to provide therebetween a draw-in gap.

3. The apparatus as defined in claim 2, wherein:

said drive means for the draw-in rolls comprise hydrostatic drive units.

4. The apparatus as defined in claim 3, further including:
pressure measuring means arranged in the draw-in pocket and connected to the drive means for said draw-in rolls in order to control the rotational speed of the draw-in rolls as a function of the measured pressure.

5. The apparatus as defined in claim 1, wherein:
said draw-in roll has a smooth surface.

6. The apparatus as defined in claim 1, wherein:
said draw-in roll has a profiled surface.

7. The apparatus as defined in claim 1, further including:
an additional draw-in roll substantially parallel to said first mentioned draw-in roll;
each of said two draw-in rolls having a respective lengthwise axis;
said extruder worm having a lengthwise axis; the lengthwise axes of the draw-in rolls being arranged at an angle with respect to the lengthwise axis of the extruder worm.

8. An apparatus for automatically, substantially uniformly drawing-in elastomeric material into a worm extruder, comprising:
a driven extruder worm;
at least one draw-in roll for material which is to be processed arranged in spaced relationship from and upstream of the extruder worm;
means for driving said draw-in roll independently of said extruder worm; and
means responsive to the pressure in the elastomeric material adjacent the extruder worm for controlling the drive of the draw-in roll to transmit only a predetermined rotational moment up to a preset maximum for maintaining a uniform feed of elastomeric material to said extruder worm.

9. An apparatus for automatically, substantially uniformly drawing in elastomeric material into a worm extruder comprising:
a driven extruder worm;
at least one draw-in roll for material which is to be processed arranged in spaced relationship from and upstream of the extruder worm;
means for driving said draw-in roll independently of said extruder worm;
means defining a material draw-in space between the draw-in roll and the extruder worm; and
means for varying the rotational speed of the draw-in roll as a function of pressure in the draw-in space between the draw-in roll and the extruder worm up to a preset maximum pressure wherein the extruder worm maintains unchanged speed while the speed of said draw-in roll is being varied.

* * * * *